(12) United States Patent
Zlotnick

(10) Patent No.: US 10,127,672 B2
(45) Date of Patent: Nov. 13, 2018

(54) SEPARATION OF FOREGROUND AND BACKGROUND IN MEDICAL IMAGES

(71) Applicant: International Business Machines Corporation, Armonk, NY (US)

(72) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 14/880,352

(22) Filed: Oct. 12, 2015

(65) Prior Publication Data

US 2017/0103519 A1   Apr. 13, 2017

(51) Int. Cl.
   *G06K 9/00*    (2006.01)
   *G06T 7/11*    (2017.01)
   *G06T 7/194*   (2017.01)
   *G06T 7/136*   (2017.01)

(52) U.S. Cl.
   CPC ............... *G06T 7/11* (2017.01); *G06T 7/136* (2017.01); *G06T 7/194* (2017.01); *G06T 2207/10116* (2013.01); *G06T 2207/30008* (2013.01); *G06T 2207/30068* (2013.01); *G06T 2207/30088* (2013.01)

(58) Field of Classification Search
None
See application file for complete search history.

(56) References Cited

U.S. PATENT DOCUMENTS 5,572,565 A   11/1996  Abdel-Mottaleb
6,351,566 B1 *  2/2002  Zlotnick .................. G06K 9/38
                                          358/466
6,738,496 B1 *  5/2004  Van Hall .................. G06K 9/38
                                          382/101
8,503,742 B2   8/2013  Dewaele et al.
8,718,345 B2 *  5/2014  Hu ..................... A61B 5/02007
                                          382/131

(Continued)

FOREIGN PATENT DOCUMENTS

EP         0576961 B1    12/2001
WO    2015024099 A1    2/2015

OTHER PUBLICATIONS

Al-Bayati et al., "Mammogram Images Thresholding for Breast Cancer Detection Using Different Thresholding Methods", Scientific Research, Advances in Breast Cancer Research, 2013, 2, 72-77, http://dx.doi.org/10.4236/abcr.2013.23013 Published Online Jul. 2013, Copyright © 2013 SciRes, 6 pages.

(Continued)

*Primary Examiner* — Nancy Bitar
(74) *Attorney, Agent, or Firm* — Stephanie L. Carusillo

(57) ABSTRACT

A method for processing an image includes computing a plurality of binarization scores for an image using a corresponding plurality of binarization threshold values, determining a selected binarization threshold value based on the plurality of binarization scores, processing the image or another image using the selected binarization threshold value. Each binarization score of the plurality of binarization scores may be based on a transition pixel count for a binary image that is derivable from the image using a specified threshold value of the plurality of thresholding values. A computer system and computer program product corresponding to the method are also disclosed herein.

16 Claims, 6 Drawing Sheets

(56) References Cited

U.S. PATENT DOCUMENTS

| | | | |
|---|---|---|---|
| 9,058,650 B2 | 6/2015 | El-Hilo et al. | |
| 9,147,123 B2* | 9/2015 | Zeng | G06K 9/4638 |
| 2003/0068077 A1* | 4/2003 | Koakutsu | G06K 7/084 |
| | | | 382/135 |
| 2011/0103703 A1* | 5/2011 | Karlov | H03M 7/48 |
| | | | 382/239 |
| 2011/0200238 A1 | 8/2011 | Garud et al. | |
| 2011/0222127 A1* | 9/2011 | Loce | G06K 15/1843 |
| | | | 358/3.27 |
| 2013/0322762 A1* | 12/2013 | Zeng | G06K 9/4638 |
| | | | 382/195 |
| 2014/0002596 A1* | 1/2014 | Antonio | H04N 19/597 |
| | | | 348/43 |
| 2014/0212066 A1* | 7/2014 | Brasnett | G06T 5/50 |
| | | | 382/284 |
| 2015/0256713 A1* | 9/2015 | Booth | H04N 1/40012 |
| | | | 358/466 |

OTHER PUBLICATIONS

Dehghani et al., "A Method for Improve Preprocessing Images Mammography", International Journal of Information and Education Technology, vol. 1, No. 1, Apr. 2011, ISSN: 2010-3689, pp. 90-93.

Long et al., "Segmentation and feature extraction of cervical spine x-ray images", National Library of Medicine, Bethesda, MD 20894, printed on Aug. 27, 2015, 10 pages.

Sahakyan et al., "Segmentation of the Breast Region in Digital Mammograms and Detection of Masses", (IJACSA) International Journal of Advanced Computer Science and Applications, vol. 3, No. 2, 2012, pp. 102-105.

* cited by examiner

SEPARATION OF FOREGROUND AND BACKGROUND IN MEDICAL IMAGES

BACKGROUND OF THE INVENTION

The present invention relates generally to the field of image processing, and more particularly to separating the foreground and the background in medical images.

Effective separation of the foreground and the background in medical images enables the detection of specific features in such images. For example, skin boundaries may be detected in mammograms and bone boundaries may be detected in X-Rays. Oftentimes, the foreground and background of medical images are separated by selecting a binarization threshold that is determined from a one dimensional histogram of the gray level values in the image. For example, the well-known method of Otsu assumes that an image contains two classes of pixels (i.e., foreground pixels and background pixels) that conform to a bi-modal histogram. A threshold is selected that minimizes the variance within each class (the intra-class variance) and thereby maximizes the variance between the classes (the inter-class variance).

SUMMARY

As disclosed herein, a method, executed by a computer, for processing an image includes computing a plurality of binarization scores for an image using a corresponding plurality of binarization threshold values, determining a selected binarization threshold value based on the plurality of binarization scores, processing the image or another image using the selected binarization threshold value. Each binarization score of the plurality of binarization scores may be based on a transition pixel count for a binary image that is derivable from the image using a specified binarization threshold value of the plurality of binarization thresholding values. A computer system and computer program product corresponding to the method are also disclosed herein.

DETAILED DESCRIPTION

The embodiments disclosed herein recognize that conventional thresholding techniques do not account for the proximity (e.g., adjacency) of pixels within the foreground and background regions. For example, given that transitions between the foreground and the background and vice versa should be relatively infrequent in an image, foreground pixels will more likely be adjacent to foreground pixels and background pixels will more likely be adjacent to background pixels. At least some of the embodiments disclosed herein select a threshold that reduces the occurrence of foreground-to-background transitions and/or background-to-foreground transitions and increases the occurrence of adjacent foreground pixels and/or adjacent background pixels.

Various embodiments will now be described in reference to the Figures.

Figure 1:
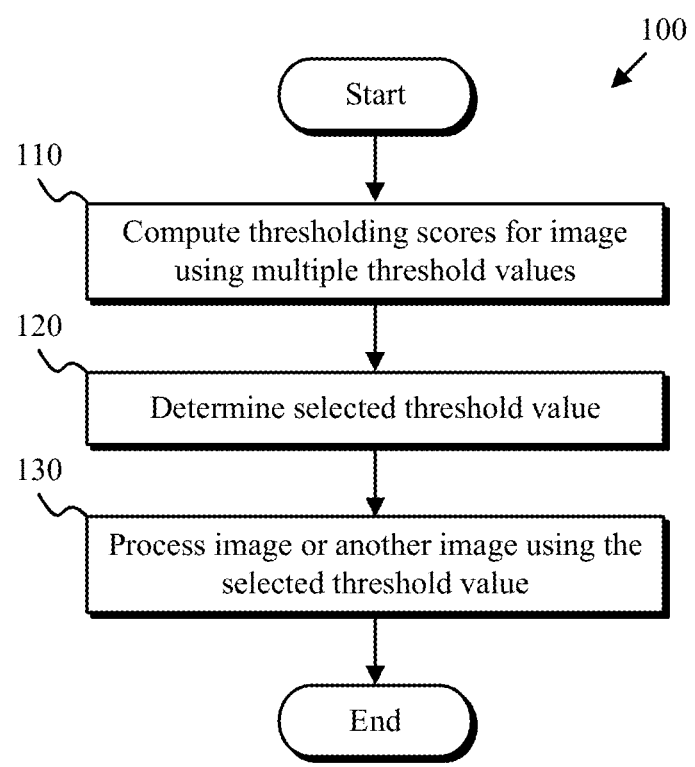
FIG. 1 is a flowchart depicting one embodiment of an image processing method in accordance with at least one embodiment of the present invention.

For example, FIG. 1 is a flowchart depicting one embodiment of an image processing method 100 in accordance with at least one embodiment of the present invention. As depicted, the image processing method 100 includes computing (110) thresholding scores, determining (120) a selected threshold value, and processing (130) an image using the selected threshold value.

Computing (110) thresholding scores may include selecting a set of threshold values and computing a thresholding score for each threshold value. The thresholding score may be calculated for a binary (e.g., black and white) image that is, or could be, generated from the image using the threshold value. The thresholding score may be inversely related to the number of binary value transitions in the binary image.

In some embodiments, a thresholding score is computed for each threshold value by generating a single gray-scale co-occurrence matrix for the image and deriving a binary co-occurrence matrix for each threshold value from the gray-scale co-occurrence matrix. In those embodiments, the values in each binary co-occurrence matrix may be used to generate the thresholding score for each threshold value. In certain embodiments, the thresholding score corresponds to a ratio of the product of the diagonal values in the binary co-occurrence matrix and the sum of the off-diagonal values in the binary co-occurrence matrix. For example, in one embodiment, the thresholding score conforms to the equation:

$$S=(C[1,1] \cdot C[2,2])/(C[1,2]+C[2,1]) \qquad (1)$$

where $C[i,j]$ is the value in the $i^{th}$ row and $j^{th}$ column of the binary co-occurrence matrix corresponding to a particular threshold value.

Determining (120) a selected threshold value may include determining a maximum or minimum value or slope for the thresholding scores and determining a threshold value corresponding to the maximum or minimum value or slope for the thresholding scores. In some embodiments, the determined threshold value is selected from the set of threshold values for which a thresholding score is calculated. In other embodiments, the determined threshold value is calculated (e.g., interpolated) based on the set of threshold values and the corresponding thresholding scores. Consequently, the determined threshold value may, or may not be, within the set of the threshold values for which a thresholding score is calculated.

Processing (130) an image using the selected threshold value may include generating a binary image from the image using the selected threshold value. The binary image may be used to determine a foreground/background boundary in the image. For example, the image may be a medical image and the binary image may be used to identify pixels in the medical image that correspond to a skin surface. In some embodiments, the binary image is used to mask out background pixels in the image and eliminate them from further processing and/or analysis.

Figure 2:
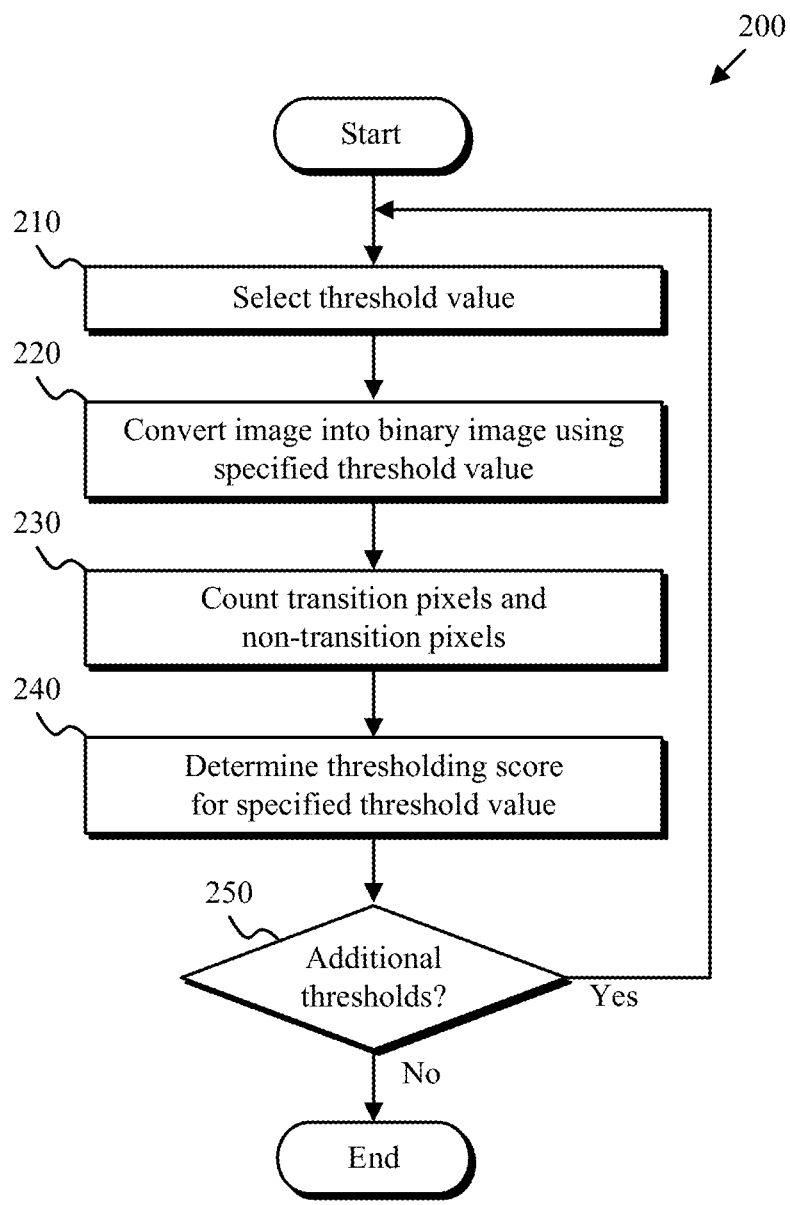
FIG. 2 is a flowchart depicting one embodiment of a threshold scoring method in accordance with at least one embodiment of the present invention.

FIG. 2 is a flowchart depicting one embodiment of a (binarization) threshold scoring method 200 in accordance with at least one embodiment of the present invention. As depicted, the threshold scoring method 200 includes selecting (210) a threshold value, converting (220) an image into a binary image, counting (230) transition pixels and non-transition pixels, determining (240) a binarization score, and determining (250) whether additional thresholds remain. The threshold scoring method 200 may be conducted in conjunction with the method 100 depicted in FIG. 1 to ascertain which binary threshold should be used in processing an image.

Selecting (210) a threshold value may include selecting a threshold value for which a thresholding score has not been calculated. In some embodiments, threshold values that are within a certain range of an expected threshold value are sequentially selected at regular or random intervals. Converting (220) an image into a binary image may include using the selected threshold value to convert the image into a binary image.

Counting (230) transition pixels and non-transition pixels may include counting adjacent pixels within the binary image that have a different binary value (e.g., BW, WB, or BW|WB) and the same binary value (e.g., BB, WW, or BB|WW). The pixel adjacency may be along a selected dimension of the image. For example, in one embodiment a pixel adjacency count for the horizontal dimension is accumulated based on the equation:

$$Cnt[2*BV[i,j]+BV[i,j+1]+1] +=1; \quad (2)$$

Where BV[i,j] is the pixel value of the binary image for the pixel located at the $i^{th}$ row and $j^{th}$ column of the image, the index variable i is iterated through each row of the binary image, and the index variable j is iterated through each column of the binary image except the last column. The accumulated counts result in an array of 4 values where the entries in the array (assuming a "black and white" binary image) represent a black-to-black (BB) pixel count, a black-to-white (BW) pixel count, a white-to-black (WB) pixel count, and a white-to-white (WW) pixel count. As used herein, the BB and/or WW pixel counts are referred to collectively as non-transition pixel counts and the BW and/or WB pixel counts are referred to collectively as (i.e., are an example of) transition pixel counts. One of skill in the art will appreciate that the accumulated counts may correspond to entries in a binary co-occurrence matrix.

Determining (240) a binarization score may include using the transition pixel count(s) and non-transition pixel count(s) to generate a score. One of skill in the art will appreciate that a variety of scoring approaches may be used based on the transition pixel count(s) and non-transition pixel count(s). Furthermore, the score may be a positive indicator that is preferably increased, or negative indicator that is preferably decreased. In one embodiment, the binarization score (S) is computed substantially according to equation (1), using the formula:

$$S=(Cnt[BB]*Cnt[WW])/(Cnt[BW]+Cnt[WB]) \quad (3)$$

where Cnt is the accumulated pixel count array from equation (2) and BB, BW, WB, and WW are appropriate indices into the pixel count array.

Determining (250) whether additional thresholds remain may include determining whether a thresholding score for each threshold within a range of interest has been calculated. If additional thresholds remain, the method loops to selecting (210) a threshold value. If no thresholds remain, the method 200 terminates.

Figure 3:
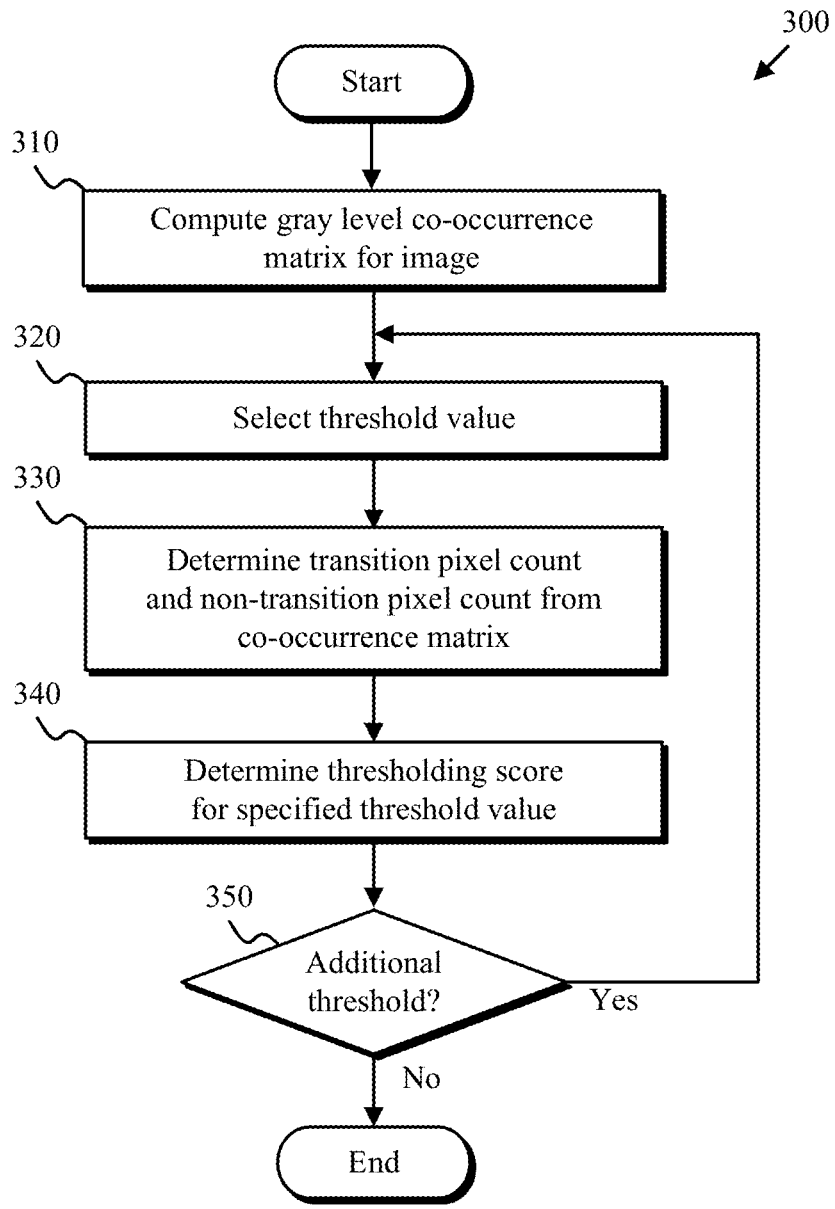
FIG. 3 is a flowchart depicting one embodiment of a threshold scoring method in accordance with at least one embodiment of the present invention.

FIG. 3 is a flowchart depicting one embodiment of a (binarization) threshold scoring method 300 in accordance with at least one embodiment of the present invention. As depicted, the threshold scoring method 300 includes computing (310) a co-occurrence matrix, selecting (320) a threshold value, determining (330) a transition and non-transition pixel count, determining (340) a binarization score, and determining (350) whether additional thresholds remain. The threshold scoring method 300 may be conducted in conjunction with the method 100 depicted in FIG. 1 to ascertain which binary threshold should be used in processing an image. In contrast to the threshold scoring method 200, the threshold scoring method 300 does not require conversion of the image into multiple binary images. Consequently, the threshold scoring method 300 may have a performance advantage over the threshold scoring method 200.

Computing (310) a co-occurrence matrix may include computing a gray level co-occurrence matrix corresponding to the image. The co-occurrence matrix may indicate the occurrence or count of gray scale levels that are adjacent to each other in the image. See FIG. 4A for an example. Similar to selecting (210), selecting (320) may include selecting a threshold value for which a thresholding score has not been calculated.

Determining (330) a transition and non-transition pixel count may include summing entries within regions within the gray level co-occurrence matrix that correspond to gray scale values that are above and below the selected threshold value. For example, the rows and columns that correspond to gray scale values that are less than the selected threshold may be associated with black pixels while the rows and columns that correspond to gray scale values that are greater than the selected threshold may be associated with white pixels.

The determining operations 340 and 350 may be conducting in a similar manner as the determining operations 240 and 250 depicted in FIG. 2.

Figure 4A:
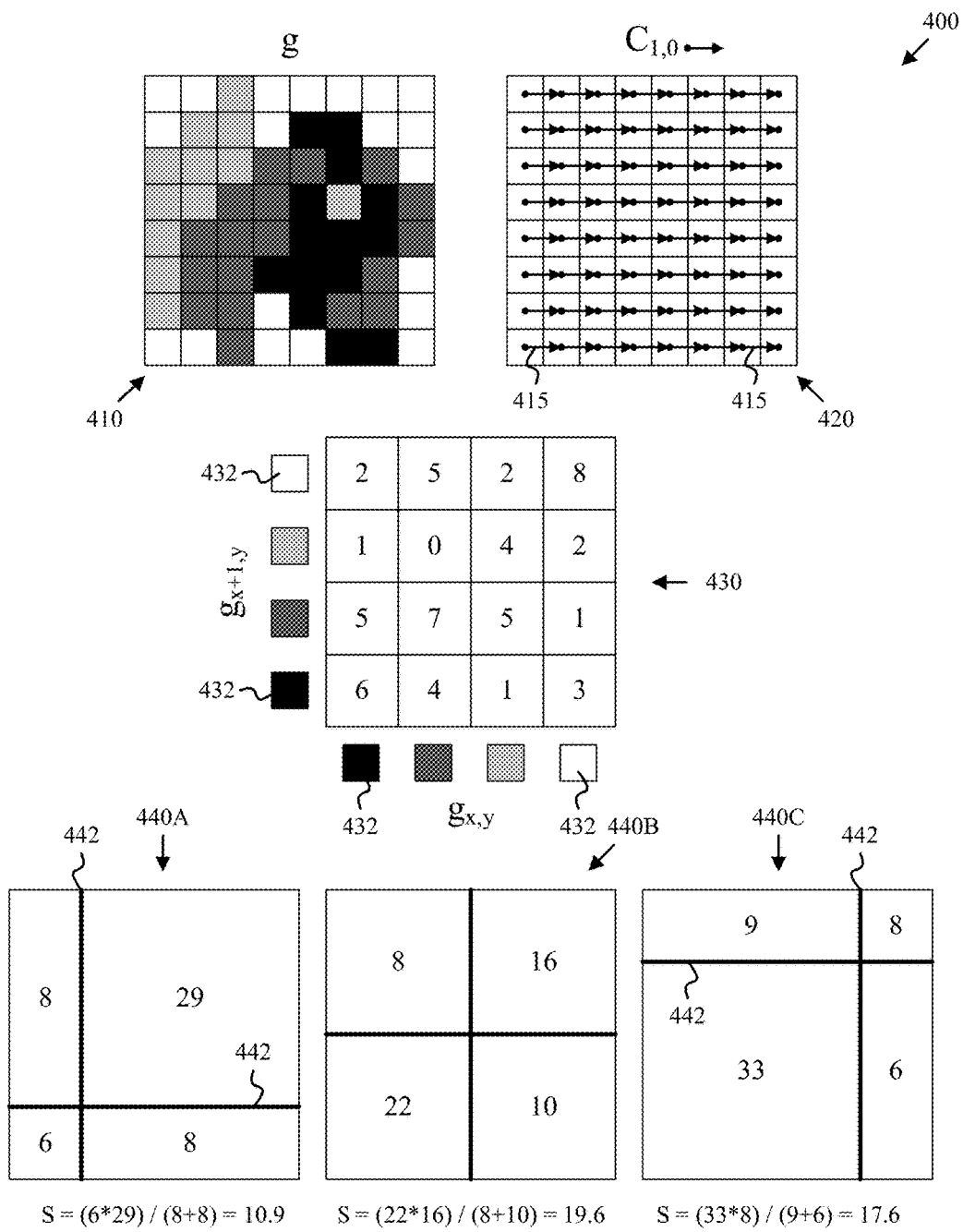
FIGS. 4A and 4B are a set of bitmaps and tables depicting particular aspects of the threshold scoring method of FIG. 3.
Figure 4B:
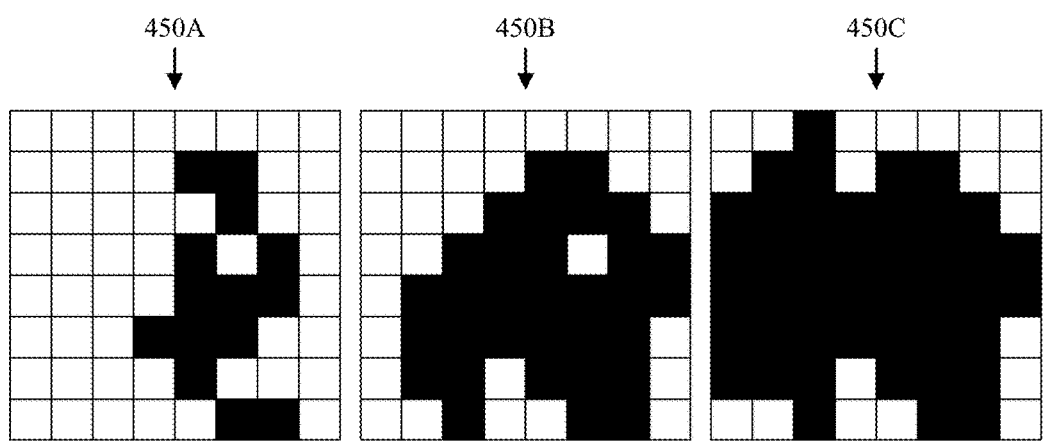

FIGS. 4A and 4B are a set of bitmaps and tables 400 depicting particular aspects of the threshold scoring method 300 depicted in FIG. 3. A bitmap image 410, such as a medical image may be processed to generate a co-occurrence matrix 430 based on an adjacency vector 415. In the depicted embodiment, each adjacency vector is [1,0] corresponding to a distance of 1 pixel along the horizontal direction (i.e., the selected dimension). For purposes of illustration, multiple adjacency vectors 415 that originate at a pixel and terminate at a neighboring pixel are assembled into an adjacency graph 420 that corresponds to the bitmap image 410 and the co-occurrence matrix 430.

The depicted co-occurrence matrix 430 indicates the number of occurrences within the bitmap image 410 of each possible pair of gray scale values 432 that are separated by the adjacency vector 415. Once calculated, the co-occurrence matrix 430 can be processed to generate various binary co-occurrence tables 440 corresponding to various selected threshold values 442. In the depicted embodiment, the selected threshold values 442 are values that are between adjacent gray scale values 432.

Processing the co-occurrence matrix 430 to generate the binary co-occurrence tables 440 may occur as follows. Each threshold value 442 is used to vertically and horizontally partition the co-occurrence matrix 430 which results in four quadrants. The entries within each quadrant can be summed to generate the binary co-occurrence tables (i.e., matrices) 440.

The depicted binary co-occurrence tables 440 indicate the number of transition pixels and non-transition pixels (separated by the adjacency vector) within a binary (e.g., black and white) image 450 that could/would be generated from the bitmap image 410 using the selected threshold value. For example, the lower left quadrant of each binary co-occurrence table 440 indicates the number (BB) of black pixels that are adjacent to black pixels within a binary image generated from the bitmap image 410 according to the selected threshold value 442. Similarly, the upper right quadrant of each binary co-occurrence table 440 indicates the number (WW) of white pixels that are adjacent to white pixels within a binary image. In the depicted examples, the number (BW) of black-to-white pixel pairs/transitions are shown in the upper left quadrant, and the number (WB) of white-to-black pixel pairs/transitions are shown in the lower right quadrant.

In some embodiments, the quadrant sums used to generate the binary co-occurrence tables 440 are generated for each selected threshold value in O(1) operations by creating a pair of accumulation tables referred to herein as accTmp and acc respectively. The accumulation tables are computed by first summing the rows and then the columns according to the equations:

$$accTmp(1,*)=C(1,*) \quad (4)$$

$$accTmp(i+1,*)=accTmp(i,*)+C(i+1,*) \quad (5)$$

$$acc(*,1)=accTmp(*,1) \quad (6)$$

$$acc(*,i+1)=acc(*,i)+accTmp(i+1,*) \quad (7)$$

where i<n, and n is the number of columns and rows.

The accumulated result in acc(i,j) is the number of pixels with a value up to i that had a right neighbor pixel value with a value up to j. Consequently, a sum of a rectangular region of the gray value co-occurrence matrix can be computed according to the equation:

$$sum(C(r0:r1,c0:c1))=acc(r1,c1)-acc(r1,c0-1)-acc(r0-1,c1)+acc(r0-1,c0-1); \quad (8)$$

where r0 and r1 are the start and end rows and c0 and c1 are the start and end columns for the rectangular region.

The number of black-to-black (BB) adjacent pixel pairs for a selected threshold value of t is:

$$BB=sum(C(0:t,0:t))+sum(C(0:t,t+1:m)) \quad (9)$$

where m is the maximal value in the image. Similarly, the number of white-to-white (WW) adjacent pixel pairs for a selected threshold value of t is:

$$WW=sum(C(t+1:m,0:t))+sum(C(t+1:m,t+1:m)) \quad (10)$$

The number of pixels transitions (X=BW+WB) i.e., transitions between black and white or white and black pixels is:

$$X=sum(C(t+1:m,0:t))+sum(C(0:t,t+1:m)) \quad (11)$$

In some embodiments, including the examples shown in FIG. 4A, each thresholding score (S) for an image is calculated according to the equation:

$$S=(BB*WW)/(BW+WB)=(BB*WW)/X \quad (12)$$

One of skill in the art will appreciate that method 300, as depicted in FIGS. 3 and 4, may provide significant performance improvements—particularly for larger images.

Figure 5:
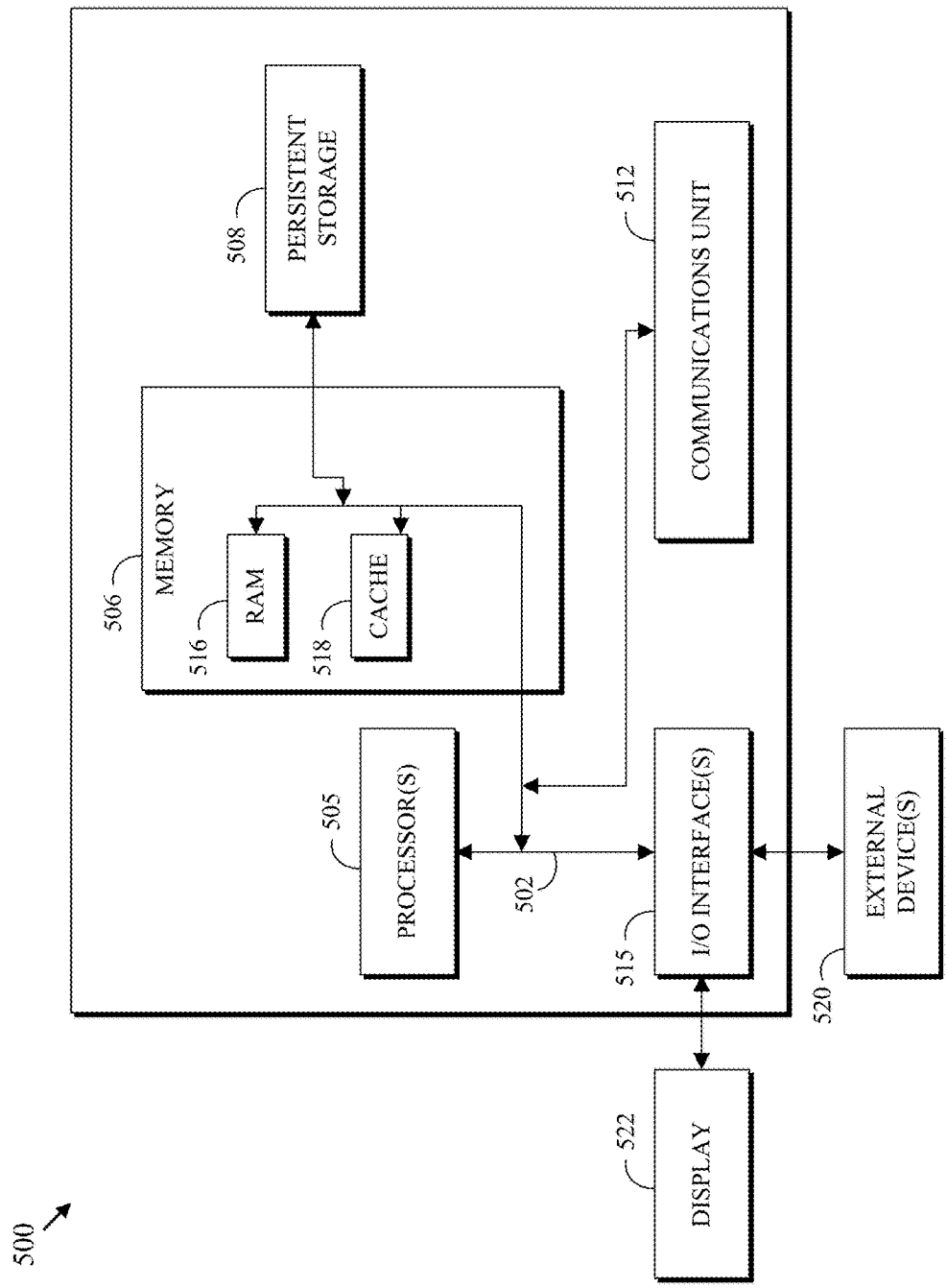
FIG. 5 is a block diagram depicting one example of a computing apparatus (i.e., computer) suitable for executing the methods disclosed herein.

FIG. 5 is a block diagram depicting components of one example of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links. I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, executed by one or more processors, the method comprising:
    computing a plurality of binarization scores for an image using a corresponding plurality of binarization threshold values;
    determining a selected binarization threshold value based on the plurality of binarization scores;
    processing the image using the selected binarization threshold value into a first binary image;
    determining a transition pixel count and a non-transition pixel count for the first binary image, wherein the transition pixel count comprises a count of pixels of differing binary values that are adjacent to each other in the first binary image and the non-transition pixel count comprises a count of pixels of equal binary values that are adjacent to each other in the first binary image;

determining a first binarization score, wherein:
the first binarization score is based on the non-transition pixel count and the transition pixel count for the first binary image,
the first binarization score corresponds to a ratio between a non-transition pixel count function and a transition pixel count function for the first binary image, and
the transition pixel count function corresponds to a sum of a black-to-white pixel transition count and a white-to-black pixel transition count for the binary image; and processing the first binary image using the first binarization score into a second binary image.

2. The method of claim 1, wherein the non-transition pixel count function corresponds to a product of an adjacent black pixel count and an adjacent white pixel count for the binary image.

3. The method of claim 1, wherein the transition pixel count comprises a count of black-to-white pixel transitions and/or a count of white-to-black pixel transitions.

4. The method of claim 1, wherein the transition pixel count corresponds to a selected dimension of the image.

5. The method of claim 1, wherein each binarization score of the plurality of binarization scores is computed by effectively partitioning a gray level co-occurrence matrix into quadrants.

6. The method of claim 5, wherein the quadrants correspond to adjacent black pixels, adjacent white pixels, black-to-white pixel transitions, and white-to-black pixel transitions.

7. The method of claim 1, wherein each binarization score of the plurality of binarization scores is computed by summing rows and columns of a gray level co-occurrence matrix.

8. The method of claim 1, wherein each binarization score of the plurality of binarization scores is inversely related to the transition pixel count.

9. The method of claim 1, wherein the selected binarization threshold value corresponds to the one or more of a local maxima, a global maxima, and a maximum positive slope for the plurality of binarization scores.

10. The method of claim 1, wherein each binarization score of the plurality of binarization scores is proportional to the transition pixel count.

11. The method of claim 1, where in the selected binarization threshold value corresponds to one or more of a local minima, a global minima, and a maximum negative slope for the plurality of binarization scores.

12. The method of claim 1, wherein the image is a mammogram.

13. A computer program product comprising:
one or more computer-readable storage media that are not transitory signals per se and program instructions stored on at least one of the one or more computer-readable storage media, the program instructions comprising instructions for:
computing a plurality of binarization scores for an image using a corresponding plurality of binarization threshold values;
determining a selected binarization threshold value based on the plurality of binarization scores;
processing the image using the selected binarization threshold value into a first binary image;
determining a transition pixel count and a non-transition pixel count for the first binary image, wherein the transition pixel count comprises a count of pixels of differing binary values that are adjacent to each other in the first binary image and the non-transition pixel count comprises a count of pixels of equal binary values that are adjacent to each other in the first binary image;
determining a first binarization score, wherein:
the first binarization score is based on the non-transition pixel count and the transition pixel count for the first binary image,
the first binarization score corresponds to a ratio between a non-transition pixel count function and a transition pixel count function for the first binary image, and
the transition pixel count function corresponds to a sum of a black-to-white pixel transition count and a white-to-black pixel transition count for the binary image; and
processing the first binary image using the first binarization score into a second binary image.

14. The computer program product of claim 13, wherein the non-transition pixel count function corresponds to a product of an adjacent black pixel count and an adjacent white pixel count for the binary image.

15. A computer system comprising:
one or more computer processors;
one or more computer-readable storage media; and
program instructions stored on at least one of the one or more computer-readable storage media for execution by at least one of the computer processors, the program instructions comprising instructions for:
computing a plurality of binarization scores for an image using a corresponding plurality of binarization threshold values;
determining a selected binarization threshold value based on the plurality of binarization scores;
processing the image using the selected binarization threshold value into a first binary image;
determining a transition pixel count and a non-transition pixel count for the first binary image, wherein the transition pixel count comprises a count of pixels of differing binary values that are adjacent to each other in the first binary image and the non-transition pixel count comprises a count of pixels of equal binary values that are adjacent to each other in the first binary image;
determining a first binarization score, wherein:
the first binarization score is based on the non-transition pixel count and the transition pixel count for the first binary image,
the first binarization score corresponds to a ratio between a non-transition pixel count function and a transition pixel count function for the first binary image, and
the transition pixel count function corresponds to a sum of a black-to-white pixel transition count and a white-to-black pixel transition count for the binary image; and
processing the first binary image using the first binarization score into a second binary image.

16. The computer system of claim 15, wherein the non-transition pixel count function corresponds to a product of an adjacent black pixel count and an adjacent white pixel count for the binary image.

* * * * *